United States Patent
Jeong et al.

(10) Patent No.: US 11,936,219 B2
(45) Date of Patent: Mar. 19, 2024

(54) BATTERY PROTECTION CIRCUIT AND OVER-CURRENT BLOCKING METHOD USING SAME

(71) Applicant: LG CHEM, LTD., Seoul (KR)

(72) Inventors: Won Jeon Jeong, Daejeon (KR); Ji Uk Jang, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 654 days.

(21) Appl. No.: 17/058,247

(22) PCT Filed: Jan. 16, 2020

(86) PCT No.: PCT/KR2020/000824
§ 371 (c)(1),
(2) Date: Nov. 24, 2020

(87) PCT Pub. No.: WO2020/153663
PCT Pub. Date: Jul. 30, 2020

(65) Prior Publication Data
US 2021/0218259 A1 Jul. 15, 2021

(30) Foreign Application Priority Data
Jan. 24, 2019 (KR) .................. 10-2019-0009287

(51) Int. Cl.
*H02J 7/00* (2006.01)
(52) U.S. Cl.
CPC ...... *H02J 7/00304* (2020.01); *H02J 7/00306* (2020.01); *H02J 7/0031* (2013.01)

(58) Field of Classification Search
CPC ................................... H02J 7/00304
USPC ......................................... 320/134
See application file for complete search history.

(56) References Cited

U.S. PATENT DOCUMENTS

| 6,194,869 B1 | 2/2001 | Peterzell |
| 9,000,750 B2 | 4/2015 | Yu et al. |
| 2004/0004458 A1 | 1/2004 | Tanaka et al. |
| 2005/0285572 A1 | 12/2005 | Geren et al. |
| 2006/0139010 A1 | 6/2006 | Wang et al. |
| 2010/0123437 A1 | 5/2010 | Takeda |

(Continued)

FOREIGN PATENT DOCUMENTS

| CN | 101777782 A | 7/2010 |
| CN | 102282739 A | 12/2011 |

(Continued)

OTHER PUBLICATIONS

Extended European Search Report for European Patent Application No. 20744345.8 dated Apr. 6, 2021.

(Continued)

*Primary Examiner* — Edward Tso
*Assistant Examiner* — Ahmed H Omar
(74) *Attorney, Agent, or Firm* — Birch, Stewart, Kolasch & Birch, LLP

(57) ABSTRACT

The present invention relates to a battery protection circuit for accurately detecting and blocking overcurrent by overcharge and overdischarge by using a power management IC (PMIC) side sensing resistor provided in an external system and connected to a battery without a separate shunt resistor mounted in the battery, and an overcurrent blocking method using the same.

10 Claims, 2 Drawing Sheets

(56) References Cited

U.S. PATENT DOCUMENTS

| | | |
|---|---|---|
| 2010/0176764 A1 | 7/2010 | Tachikawa et al. |
| 2011/0267726 A1 | 11/2011 | Skeuchi et al. |
| 2011/0273804 A1 | 11/2011 | Ikeuchi et al. |
| 2015/0311493 A1* | 10/2015 | Abe ................ H01M 10/0431 429/7 |
| 2016/0322840 A1 | 11/2016 | Maetani |
| 2016/0380447 A1 | 12/2016 | Kadirvel et al. |

FOREIGN PATENT DOCUMENTS

| | | |
|---|---|---|
| JP | 11-69635 A | 3/1999 |
| JP | 2005-168159 A | 6/2005 |
| JP | 2009-195021 A | 8/2009 |
| JP | 2010-166631 A | 7/2010 |
| KR | 20-0222297 Y1 | 5/2001 |
| KR | 10-2001-0071306 A | 7/2001 |
| KR | 10-2004-0004057 A | 1/2004 |
| KR | 10-0570726 B1 | 4/2006 |
| KR | 10-2007-0013836 A | 1/2007 |
| KR | 20070013836 A * | 1/2007 .......... H02J 7/00302 |
| KR | 10-2007-0101895 A | 10/2007 |
| KR | 10-0824828 B1 | 4/2008 |
| KR | 10-1208570 B1 | 12/2012 |
| KR | 10-2018-0047178 A | 5/2018 |
| KR | 10-2018-0049456 A | 5/2018 |

OTHER PUBLICATIONS

First Office Action for European Patent Application No. 20744345.8 dated Dec. 22, 2022.

International Search Report issued in PCT/KR2020/000824 (PCT/ISA/210), dated Apr. 29, 2020.

* cited by examiner

Conventional Art

BATTERY PROTECTION CIRCUIT AND OVER-CURRENT BLOCKING METHOD USING SAME

TECHNICAL FIELD

The present invention relates to a battery protection circuit and an overcurrent blocking method using the same, and more particularly, to a battery protection circuit capable of precisely blocking overcurrent of a battery without mounting a separate shunt resistor in the battery, and an overcurrent blocking method using the same.

BACKGROUND ART

In general, a battery is used as a source of energy for various portable electronic devices including smart phones, notebook computers, PDAs, and the like. Batteries generate heat due to overcharge or overcurrent, and as the temperature continues to rise, the performance may degrade and also explosion may occur.

In order to prevent this problem, a typical smartphone battery is equipped with a protection circuit module that detects and blocks the inflow of overcharge, overcharge and overcurrent or is installed and used with a protection circuit that detects overcharge, overcharge and overheating outside the battery and blocks the operation of the battery.

In general, the protection circuit may be classified into a general overcurrent protection circuit and a high-precision overcurrent protection circuit according to whether a high-precision current of the battery is required.

As shown in FIG. 1, a general overcurrent protection circuit that does not require high-precision current is generally applied with a high-precision overcurrent sensing non-supporting protection IC 11, and detects the overcurrent with the difference value of the voltage across the charge FET 12 and the discharge FET 13 disposed between the reference terminal Vss and the monitoring terminal V−. However, since the resistance of the charge/discharge FET 12, 13 has a large amount of change according to the level of the voltage of the battery 14 and a large amount of change according to temperature due to heat generation, and the like, it is difficult to precisely block the overcurrent inflow due to the wide range of overcurrent detection. The overcurrent protection circuit includes battery 14 having a positive battery terminal B+ and a negative battery terminal B−, which are connected to a positive terminal P+ and a negative terminal P−.

As described above, in order to have a precise overcurrent detection range in order to solve the problems of the general overcurrent protection circuit, a method of detecting the overcurrent by using a shunt resistor that maintains a constant resistance even in external environments such as temperature changes, not the resistance of the FET, should be used. This typically, as shown in FIG. 2, can detect overcurrent based on the voltage across the shunt resistor disposed between the reference terminal Vss and the overcurrent sense terminal Rsens of the protection IC 21 by applying a high-precision overcurrent sensing supporting protection IC 21 equipped with an overcurrent detection terminal Rsens for detecting overcurrent through the shunt resistor. The overcurrent protection circuit includes battery 14 having a positive battery terminal B+ and a negative battery terminal B−, which are connected to a positive terminal P+ and a negative terminal P−, a charge FET 22 connected to a charge out Cout and a discharge FET 23 connected to a discharge out Dout.

However, for this, since a separate shunt resistor must be installed in the battery, cue to the mounting space and the like, there is a limit in realizing the miniaturization of the battery, and there are problems such as an increase in unit price and an increase in battery internal resistance.

(Patent Literature 1) KR10-2007-0101895 A

DISCLOSURE OF THE INVENTION

Technical Problem

The present invention is to solve the above-described problems and provides a battery protection circuit capable of precise overcurrent blocking without mounting a shunt resistor in the battery.

Technical Solution

A battery protection circuit of a battery connected to an external system connected to the battery, which includes a power management unit having a sensing resistor for sensing an incoming battery current, includes a battery charge/discharge input and output unit connected to the external system; a control unit configured to sense overcurrent by overcharge and overdischarge and control a charge/discharge control FET; a charge control FET configured to control a flow of charge current of the battery under control of the control unit; and a discharge control FET configured to control a flow of discharge current of the battery under control of the control unit. The control unit is connected to both ends of the sensing resistor of the power management unit of the external system to sense overcurrent by overcharge and overdischarge of the battery from a voltage at both ends of the sensing resistor.

Specifically, the control unit includes: an overcurrent sensing unit connected to both ends of the sensing resistor of the power management unit of the external system to sense a voltage generated at both ends thereof; an overcurrent detection unit configured to compare a voltage at both ends of the sensing resistor sensed by the overcurrent sensing unit with a predetermined reference overcurrent blocking voltage value and detect an overcurrent due to an overcharge or an overdischarge of a battery according to a result of the comparison; and a FET control unit configured to off-control the charge control FET or the discharge control FET as the overcurrent by overcharge or overdischarge is detected from the overcurrent detection unit.

The overcurrent detection unit includes: a charge overcurrent detection unit configured to determine that the battery is in an overcurrent state due to overcharge and output a charge overcurrent signal when a voltage sensed by the overcurrent sensing unit is equal to or greater than a predetermined reference charge overcurrent voltage value during charge; and a discharge overcurrent detection unit configured to determine that the battery is in an overcurrent state due to overdischarge and output a discharge overcurrent signal when a voltage sensed by the overcurrent sensing unit is equal to or greater than a predetermined reference discharge overcurrent voltage value during discharge.

Accordingly, when a charge overcurrent signal is outputted from the charge overcurrent detection unit, the FET control unit turns off the charge control FET to block overcurrent due to overcharge, and when a discharge overcurrent signal is outputted from the discharge overcurrent detection unit, the FET control unit turns off the discharge control FET to block overcurrent due to overdischarge.

A method for blocking overcurrent in a battery protection circuit includes: an overcurrent sensing step of sensing, in the overcurrent sensing unit, a voltage at both ends of a sensing resistor of a power management unit provided in an external system connected to a battery; an overcurrent detection step of detecting, in the overcurrent detection unit, an overcurrent due to overcharge or overdischarge of a battery, based on a voltage at both ends of a sensing resistor of a power management unit of the external system, which is sensed through the overcurrent sensing step; and an overcurrent blocking step of turning off, in the FET control unit, the charge control FET or the discharge control FET to block overcurrent, which corresponds to the battery detected to be in an overcurrent state by overcharge or overdischarge through the overcurrent detection step.

Specifically, the overcurrent detection step includes: a charge overcurrent detection step of detecting overcurrent due to overcharge according to the comparison result during charge by comparing a voltage at both ends of the sensing resistor of the power management unit of the external system, which is sensed through the overcurrent sensing step, with a predetermined reference charge overcurrent blocking voltage value; and a discharge overcurrent detection step of detecting overcurrent by overdischarge according to the comparison result during discharge by comparing a voltage at both ends of the sensing resistor of the power management unit of the external system, which is sensed through the overcurrent sensing step, with a predetermined reference discharge overcurrent blocking voltage value.

The charge overcurrent detection step detects that the battery is in an overcurrent state due to overcharge if a voltage at both ends of the sensing resistor of the power management unit of the external system, which is sensed through the overcurrent sensing step, is more than a predetermined reference charge overcurrent voltage value and the discharge overcurrent detection step detects that the battery is in overcurrent due to overdischarge if a voltage at both ends of the sensing resistor of the power management unit of the external system, which is sensed through the overcurrent sensing step, is more than a predetermined reference discharge overcurrent voltage value.

Accordingly, the overcurrent blocking step turns off the charge control FET to block overcurrent due to overcharge if the battery is detected to be in an overcurrent state due to an overcharge through the charge overcurrent detection step, and turns off the discharge control FET to block overcurrent by overdischarge if the battery is detected to be in an overcurrent state due to an overdischarge through the discharge overcurrent detection step.

Meanwhile, the battery protection circuit as described above may be included in the battery pack.

Furthermore, the battery pack including the battery protection circuit may be included in the device.

Advantageous Effects

Since the present invention does not have a shunt resistor in the battery, it does not occupy a separate mounting space, so it is efficient to realize the miniaturization of the battery, and it is possible to provide improved efficiency in terms of cost because no increase in unit cost occurs.

In addition, it is possible to prevent the battery internal resistance increase due to the shunt resistor, thereby improving the stability of the battery.

MODE FOR CARRYING OUT THE INVENTION

Figure 1:
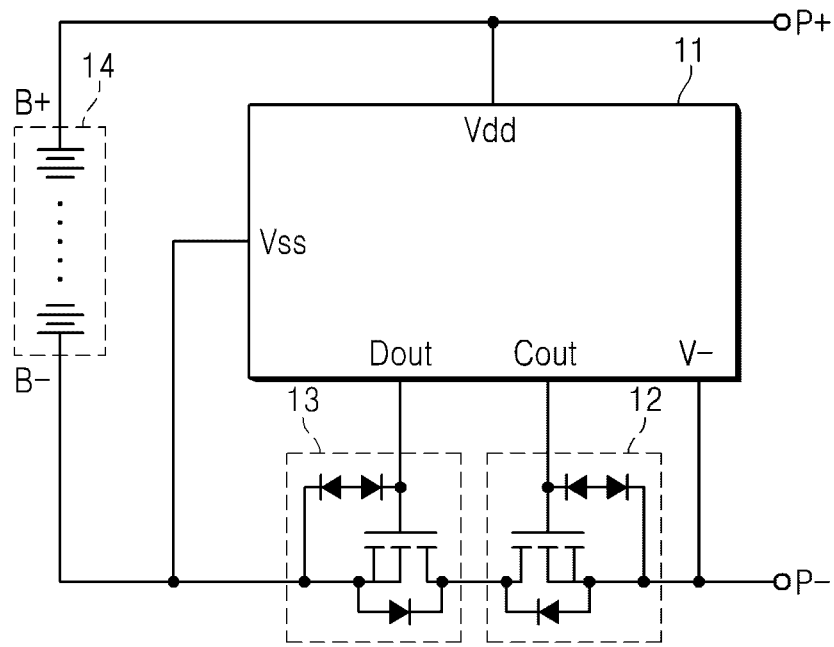
FIG. 1 is a view showing a conventional general overcurrent protection circuit.

Hereinafter, embodiments of the present invention will be described in detail with reference to the accompanying drawings so that those skilled in the art may easily carry out the present invention. The present invention may, however, be embodied in different forms and should not be construed as limited to the embodiments set forth herein. Parts not relating to description are omitted in the drawings in order to clearly describe the present invention and like reference numerals refer to like elements throughout.

Although the terms "initial," "second," etc., may be used herein to describe various elements, these elements should not be limited by these terms. The above terms are used only to distinguish one component from another. For example, an initial component may be referred to as a second component and vice versa without departing from the scope of the present invention. Terms used in this specification are used to describe specific embodiments, and are not intended to limit the scope of the present invention. The singular expressions include plural expressions unless the context clearly dictates otherwise.

Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. The term "~ing operation" or "operation of ~ing" used throughout the specification does not mean "operation for ~ing".

Terms used in this specification may be currently widely used general terms in consideration of functions in the present invention but may vary according to the intents of those skilled in the art, precedents, or the advent of new technology. Additionally, in certain cases, there may be terms the applicant selects arbitrarily and in this case, their meanings are described in a corresponding description part of the present invention. Accordingly, terms used in the present invention should be defined based on the meaning of the term and the entire contents of the present invention instead of the simple term name.

Figure 3:
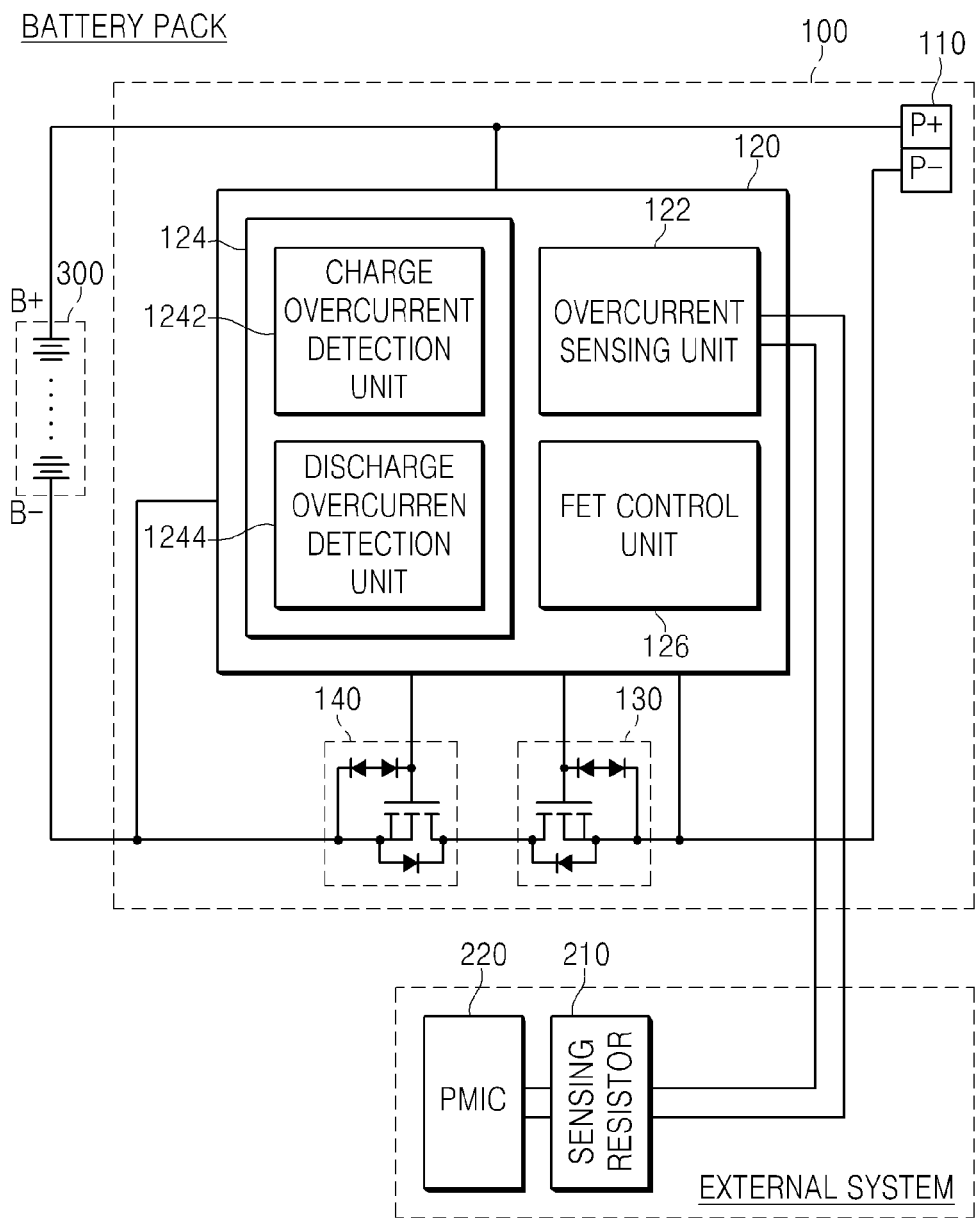
FIG. 3 is a view schematically showing a battery protection circuit according to the present invention.

Hereinafter, the present invention will be described in more detail with reference to FIG. 3.

1. Battery Protection Circuit 100 According to Present Invention

The battery protection circuit according to the present invention may include a battery charge/discharge input and output unit 110, a control unit 120, a charge control FET 130, and a discharge FET 140.

1.1. Battery Charge/Discharge Input and Output Unit 110

The battery charge/discharge input and output unit is a configuration connected to an external system and/or an external battery charge device including a power management unit having sensing resistor to sense incoming battery current of the battery 300, having a positive battery terminal B+ and a negative battery terminal B−. Here, the external system may be a mobile terminal including a mobile phone, a notebook computer, a wearable electronic device, and the like.

1.2. Control Unit 120

The control unit is a configuration that senses the charge overcurrent due to overcharge and the discharge overcurrent due to overdischarge and protects the battery from charge overcurrent and discharge overcurrent due to overcharge and overdischarge according to the sensing result through controls of the charge/discharge control FETs 130 and 140, and may be configured to include the following detailed configuration.

A. Overcurrent Sensing Unit 122

The overcurrent sensing unit may be a configuration that senses a current flowing in the battery to detect an overcurrent state due to overcharge or overdischarge of the battery. The overcurrent sensing unit according to the present invention is connected to the sensing resistor 210 of the power management 200 provided in the external system connected to the battery through the battery charge/discharge input and output unit 110, so that through this, it can sense current. That is, instead of having a separate shunt resistor on the battery for precise overcurrent sensing, the sensing resistor 210 mounted on the power management unit 200 provided in an external system connected to the battery is commonly used, so that this senses the overcurrent caused by overcharge and overdischarge of the battery.

As described in detail, in general, an external system composed of portable terminals such as mobile phones, laptops, wearable electronic devices, etc., which uses a battery as a power source, is provided with the power management unit 200 to efficiently manage the battery power by actively dealing with limited battery power with respect to various load variations. The power management unit 200 is provided with a sensing resistor 210 for sensing the current of the battery flowing in order to efficiently manage the battery power as described above. Thus, the sensed overcurrent sensing unit of the present invention may be configured to be connected to both ends of the sensing resistor 210 provided in the power management unit 200 of the external system to sense overcurrent of the battery, without mounting a separate shunt resistor in the battery.

Here, the sensing resistor 210 provided in the power management unit 200 means, more specifically, the sensing resistor 210 mounted in the peripheral circuit of the power management IC (PMIC) 220, and the power management unit 200 in the present specification may refer to a configuration including the sensing resistor 210 and the power management IC (PMIC) 220.

The sensing resistor 210 may be configured as a shunt resistor.

Sensing the overcurrent of the battery connected to both ends of the sensing resistor 210 of the power management unit 200 in the overcurrent sensing unit may consist of sensing the voltage at both ends of the current generated by the current flowing through the sensing resistor 210. When a current flows through the sensing resistor 210, a voltage is generated at both ends of the sensing resistor 210. Accordingly, the overcurrent sensing unit may sense whether the current flowing through the sensing resistor is overcurrent by sensing the voltage at both ends of the sensing resistor 210.

As such, the overcurrent sensing unit of the present invention commonly uses the sensing resistor 210 of the power management unit 200 in order for overcurrent sensing of the battery through a circuit pattern configured to be connected to both ends of the sensing resistor 210 of the power management unit 200 provided in the external system, so that since there is no separate shunt resistor in the battery, the space can be reduced, which is efficient for miniaturizing the battery, and it is efficient in terms of cost as there is no price increase for shunt resistor. In addition, the battery internal resistance can be reduced to allow more stable battery operation.

Figure 2:
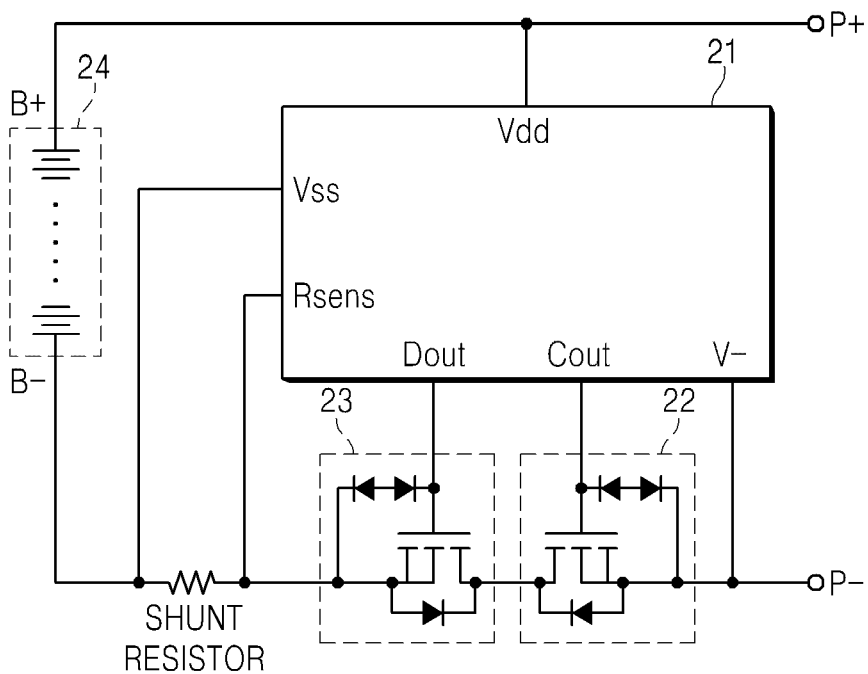
FIG. 2 is a view showing a conventional high-precision overcurrent protection circuit.

Such an overcurrent sensing unit may be configured in the overcurrent sensing terminal Rsens provided in the protection IC applied for the high-precision overcurrent detection of FIG. 2. That is, in the present invention, the overcurrent sensing unit that means an overcurrent sensing terminal Rsens of the protection IC is connected to both ends of the sensing resistor 210 of the power management unit 200 provided in the external system connected to the battery and is configured to sense the voltage to detect the overcurrent of the battery as shown in FIG. 3, rather than detecting overcurrent through a shunt resistor built into the battery as shown in FIG. 2.

B. Overcurrent Detection Unit 124

The overcurrent detection unit may be configured to detect whether there is overcurrent by overcharge or overdischarge of the battery by using the voltage at both ends of the sensing resistor 210 sensed by the overcurrent sensing unit 122.

1) Charge Overcurrent Detection Unit 1242

During battery charge, by using the voltage at both ends of the sensing resistor 210 sensed by the overcurrent sensing unit 122, it may be configured to detect whether the overcurrent state by the overcharge. After comparing the voltage value at both ends of the sensing resistor 210 sensed by the overcurrent sensing unit 122 with a predetermined reference charge overcurrent blocking voltage value, if the sensed voltage value at both ends of the sensing resistor 210 is greater than or equal to a predetermined reference charge overcurrent voltage value, it can be determined that the state is overcurrent due to overcharge. In this way, if it is determined that the overcurrent state by the overcharge, the charge overcurrent signal can be outputted.

Here, when the principle of detecting the overcurrent of the battery by the voltage value at both ends of the sensing resistor 210 of the power management unit 200 provided in the external system is described, the value of the sensing resistor 210 is a fixed value, and when the current of the battery flows through the sensing resistor 210, a voltage proportional to the sensing resistor value and the flowing current is generated at both ends of the resistance. That is, the current flowing through the resistance is measured by the voltage across the resistance using a property proportional to the resistance (I=V/R). Therefore, it is possible to detect whether the current flowing through the resistance is overcurrent through the voltage value at both ends of the sensing resistor 210.

Accordingly, the reference charge overcurrent voltage value may be set to a voltage value generated when a current corresponding to the reference blocking charge overcurrent value for determining overcurrent blocking due to overcharge in the sensing resistor 210 flows.

Such a charge overcurrent detection unit may mean a charge overcurrent detection circuit.

2) Discharge Overcurrent Detection Unit 1244

During battery discharge, by using the voltage at both ends of the sensing resistor 210 sensed by the overcurrent sensing unit 122, it may be configured to detect whether the overcurrent state by the overdischarge. After comparing the voltage value at both ends of the sensing resistor 210 sensed by the overcurrent sensing unit 122 with a predetermined reference discharge overcurrent blocking voltage value, if the sensed voltage value at both ends of the sensing resistor 210 is greater than or equal to a predetermined reference discharge overcurrent voltage value, it can be determined that the state is overcurrent due to overdischarge. In this way, if it is determined that the overcurrent state by the overdischarge, the discharge overcurrent signal can be outputted.

Here, since the principle of detecting the overcurrent of the battery by the voltage value at both ends of the sensing resistor 210 of the power management unit 200 is the same as that described in the charge overcurrent detection unit 1242, a detailed description thereof will be omitted.

Accordingly, the reference discharge overcurrent voltage value may be set to a voltage value generated when a current corresponding to the reference blocking discharge overcurrent value for determining overcurrent blocking due to overdischarge in the sensing resistor 210 flows.

Such a discharge overcurrent detection unit may mean a discharge overcurrent detection circuit.

For reference, since the current direction is different between the charge and discharge of the battery, the charge overcurrent detection unit 1242 and the discharge overcurrent detection unit 1244 may detect the corresponding overcurrent state by dividing the charge and the discharge of the battery according to the current direction.

Such a control unit 120 may be configured with a high-precision overcurrent sensing supporting protection IC having a terminal for sensing overcurrent through a shunt resistor shown in FIG. 2.

C. FET Control Unit 126

The FET control unit may be a configuration that controls the charge control FET 130 or the discharge control FET 140 according to the signals outputted from the charge overcurrent detection unit 1242 and the discharge overcurrent detection unit 1244 to block overcurrent due to overcharge or overdischarge due to overcharge occurring in the battery.

Specifically, when the charge overcurrent signal is outputted from the charge overcurrent detection unit 1242, the battery that is being charged may be recognized as being in an overcurrent state due to overcharge and may be turned off by outputting an off signal to the charge control FET 130 to block overcurrent due to overcharge.

In addition, when the discharge overcurrent signal is outputted from the discharge overcurrent detection unit 1244, the battery that is being discharged may be recognized as being in an overcurrent state due to overdischarge and may be turned off by outputting an off signal to the discharge control FET 140 to block overcurrent due to overdischarge.

1.3. Charge Control FET 130

The charge control FET is a configuration that controls the flow of charge current outputted from an external battery charge device connected to a battery under the control of the control unit 120, and as described above, when the Off signal is inputted from the FET control unit 126, the battery can be protected from overcurrent by overcharge by turning off the charge current.

1.4. Discharge Control FET 140

The discharge control FET is a configuration that controls the flow of the discharge current of the battery supplied to the external system connected to the battery under the control of the control unit 120, and as described above, when the Off signal is inputted from the FET control unit 126, the battery can be protected from overcurrent by overdischarge by turning off the discharge.

The battery protection circuit according to the present invention commonly uses the sensing resistor 210 of the power management unit 200 provided in the external system connected to the battery pack without mounting a separate shunt resistor in the pack provided in a battery pack so that it can protect the battery from overcurrent by precisely blocking overcurrent due to overcharge or overdischarge.

2. Overcurrent Blocking Method of Battery Protection Circuit According to Present Invention

2.1. Overcurrent Sensing Step (S100)

In the overcurrent sensing unit 122, the voltage at both ends of the sensing resistor 210 of the power management unit 200 is sensed to detect the overcurrent of the battery. As described above, in the related art, a separate shunt resistor is provided in the battery pack for precise overcurrent detection, thereby detecting the overcurrent of the battery. However, the present invention constitutes a circuit pattern connected to both ends of the overcurrent sensing unit 122 of the control unit 120 and the sensing resistor 210 of the power management unit 200 so that it can detect the overcurrent of the battery through the voltage sensing that occurs at both ends thereof. That is, without a separate shunt resistor, the power management IC (PMIC) 200 side sensing resistor 210 is commonly used to detect overcurrent of the battery.

Therefore, the overcurrent sensing step of sensing the voltage of the sensing resistor both ends 210 of the power management unit 200 of the external system by the overcurrent sensing unit 122 may be performed.

As such, the present invention can sense the overcurrent of the battery by commonly using the sensing resistor 210 of the power management unit 200 in order for overcurrent sensing of the battery through the overcurrent sensing unit 122 configured to be connected to both ends of the sensing resistor 210 of the power management unit 200 provided in the external system connected to the battery.

2.2. Overcurrent Detection Step (S200)

As such, the present invention can sense the overcurrent of the battery by commonly using the sensing resistor 210 of the power management unit 200 in order for overcurrent sensing of the battery through the overcurrent sensing unit 122 configured to be connected to both ends of the sensing resistor 210 of the power management unit 200 provided in the external system connected to the battery.

1) Charge Overcurrent Detection Step (S210)

The charge overcurrent detection step is performed by the above-described charge overcurrent detection unit 1242 during battery charge, and by comparing the voltage value at both ends of the sensing resistor 210 of the power management unit 200 of the external system, which is sensed through the overcurrent sensing step (S100), with a predetermined reference charge overcurrent blocking voltage value during battery charge, so that according to the comparison result, overcurrent by overcharge can be detected. Specifically, when the sensed voltage value at both ends of the sensing resistor 210 of the power management unit 200 is greater than or equal to a predetermined reference charge overcurrent blocking voltage value, it may be detected that overcurrent due to overcharge occurs. When it is detected that overcurrent is caused by overcharge, the charge overcurrent detection unit 1242 may output a charge overcurrent signal to block it.

Here, when the principle of detecting the overcurrent of the battery by the voltage value at both ends of the sensing resistor 210 of the power management unit 200 of the external system is described, the value of the sensing resistor is a fixed value, and when the current of the battery flows through the sensing resistor 210, a voltage proportional to the sensing resistor value and the flowing current is generated at both ends of the resistance. That is, the current flowing through the resistance is measured by the voltage across the resistance using a property proportional to the resistance (I=V/R). Therefore, it is possible to detect whether the current flowing through the resistance is overcurrent through the voltage value at both ends of the sensing resistor 210.

Accordingly, the reference charge overcurrent voltage value may be set to a voltage value generated when a current corresponding to the reference blocking charge overcurrent value for determining overcurrent blocking due to overcharge in the sensing resistor 210 flows.

Here, the charge overcurrent detection unit 1242 performing the charge overcurrent detection step may refer to a charge overcurrent detection circuit as described above.

2) Discharge Overcurrent Detection Step (S220)

The discharge overcurrent detection step is performed by the above-described discharge overcurrent detection unit 1244 during battery discharge, and by comparing the voltage value at both ends of the sensing resistor 210 of the power management unit 200 of the external system, which is sensed through the overcurrent sensing step (S100), with a predetermined reference discharge overcurrent blocking voltage value during battery discharge, so that according to the comparison result, overcurrent by overdischarge can be detected. Specifically, when the sensed voltage value at both ends of the sensing resistor 210 of the power management unit 200 is greater than or equal to a predetermined reference discharge overcurrent detection voltage value, it may be detected that overcurrent due to overdischarge occurs. When it is detected that overcurrent is caused by overdischarge, the discharge overcurrent detection unit 1244 may output a discharge overcurrent signal to block it.

Here, since the principle of detecting the overcurrent of the battery by the voltage value at both ends of the sensing resistor 210 of the power management unit 200 of the external system is the same as that described in the charge overcurrent detection step (S210), a detailed description thereof will be omitted.

Accordingly, the reference discharge overcurrent voltage value may be set to a voltage value generated when a current corresponding to the reference blocking discharge overcurrent value for determining overcurrent blocking due to overdischarge in the sensing resistor 210 flows.

Here, the discharge overcurrent detection unit 1244 performing the discharge overcurrent detection step may refer to a discharge overcurrent detection circuit as described above.

2.3. Overcurrent Blocking Step (S300)

In the FET control unit 126, as the overcurrent by overcharge or overdischarge is detected through the overcurrent detection step (S200), it is a step of controlling the charge control FET 130 or the discharge control FET 140 to block the overcurrent.

Specifically, when overcurrent is detected by the overcharge through the charge overcurrent detection step (S210) performed by the charge overcurrent detection unit 1242 during battery charge, the charge control FET 130 may be turned off to block overcurrent due to overcharge. When the charge overcurrent signal is outputted from the charge overcurrent detection unit 1242, the FET control unit 126 recognizes that overcurrent due to overcharge occurs, and overcurrent due to overcharge can be blocked by outputting an off signal to the charge control FET 130.

In addition, when overcurrent by overdischarge is detected through the discharge overcurrent detection step (S220) performed by the discharge overcurrent detection unit 1244 during battery discharge, the discharge control FET 140 may be turned off to block overcurrent due to overdischarge. When the discharge overcurrent signal is outputted from the discharge overcurrent detection unit 1244, the FET control unit 126 recognizes that overcurrent due to overdischarge occurs, and overcurrent due to overdischarge can be blocked by outputting an off signal to the discharge control FET 140.

Therefore, by blocking the overcurrent by overcharge or overdischarge through the overcurrent blocking step (S300), it is possible to protect the battery from the overcurrent.

As such, the present invention commonly uses the sensing resistor 210 of the power management unit 200 provided in the external system connected to the battery through the above-described S100 to S300, without mounting a separate shunt resistor in the battery, so that accurate overcurrent blocking can be implemented. Accordingly, since the mounting space of the shunt resistor in the battery can be reduced, it is efficient to realize the miniaturization of the battery, and it is efficient in terms of cost as there is no unit price increase due to shunt resistor. In addition, since battery internal resistance does not increase, stable battery operation may be possible in the long term.

On the other hand, although the technical idea of the present invention is specifically described with reference to the above embodiments, it should be noted that the above embodiments are for the purpose of explanation and not for the purpose of limitation. It will be apparent to those skilled in the art that various modifications and variations may be made in the present invention without departing from the spirit and scope of the invention.

The invention claimed is:

1. A battery protection circuit connected to a battery and to an external system, the external system including a power management unit having a sensing resistor for sensing an incoming battery current, the battery protection circuit comprising:
a battery charge/discharge input and output unit connected to the external system;

a control unit configured to sense overcurrent by overcharge and overdischarge with the sensing resistor of the external system and control a charge/discharge control FET;
a charge control FET configured to control a flow of charge current of the battery under control of the control unit; and
a discharge control FET configured to control a flow of discharge current of the battery under control of the control unit,
wherein the control unit is connected to both ends of the sensing resistor of the power management unit of the external system to sense overcurrent by overcharge and overdischarge of the battery from a voltage at both ends of the sensing resistor,
wherein the power management unit of the external system includes a power management IC and the sensing resistor mounted in a peripheral circuit of the power management IC, and
wherein the battery does not include a separate shunt resistor to reduce a size of the battery.

2. The battery protection circuit of claim 1, wherein the control unit comprises:
an overcurrent sensing unit connected to both ends of the sensing resistor of the power management unit of the external system to sense a voltage generated at both ends thereof;
an overcurrent detection unit configured to compare a voltage at both ends of the sensing resistor sensed by the overcurrent sensing unit with a predetermined reference overcurrent blocking voltage value and detect an overcurrent due to an overcharge or an overdischarge of a battery according to a result of the comparison; and
a FET control unit configured to off-control the charge control FET or the discharge control FET as the overcurrent by overcharge or overdischarge is detected from the overcurrent detection unit.

3. The battery protection circuit of claim 2, wherein the overcurrent detection unit comprises:
a charge overcurrent detection unit configured to determine that the battery is in an overcurrent state due to overcharge and output a charge overcurrent signal when a voltage sensed by the overcurrent sensing unit is equal to or greater than a predetermined reference charge overcurrent voltage value during charge; and
a discharge overcurrent detection unit configured to determine that the battery is in an overcurrent state due to overdischarge and output a discharge overcurrent signal when a voltage sensed by the overcurrent sensing unit is equal to or greater than a predetermined reference discharge overcurrent voltage value during discharge.

4. The battery protection circuit of claim 3, wherein when a charge overcurrent signal is outputted from the charge overcurrent detection unit, the FET control unit turns off the charge control FET to block overcurrent due to overcharge, and
when a discharge overcurrent signal is outputted from the discharge overcurrent detection unit, the FET control unit turns off the discharge control FET to block overcurrent due to overdischarge.

5. A method for blocking overcurrent in a battery protection circuit according to claim 1, the method comprising:
an overcurrent sensing step of sensing, in the overcurrent sensing unit, a voltage at both ends of a sensing resistor of a power management unit provided in an external system connected to a battery;
an overcurrent detection step of detecting, in the overcurrent detection unit, an overcurrent due to overcharge or overdischarge of a battery, based on a voltage at both ends of a sensing resistor of a power management unit of the external system, which is sensed through the overcurrent sensing step; and
an overcurrent blocking step of turning off, in the FET control unit, the charge control FET or the discharge control FET to block overcurrent, which corresponds to the battery detected to be in an overcurrent state by overcharge or overdischarge through the overcurrent detection step.

6. The method of claim 5, wherein the overcurrent detection step comprises:
a charge overcurrent detection step of detecting overcurrent due to overcharge according to the comparison result during charge by comparing a voltage at both ends of the sensing resistor of the power management unit of the external system, which is sensed through the overcurrent sensing step, with a predetermined reference charge overcurrent blocking voltage value; and
a discharge overcurrent detection step of detecting overcurrent by overdischarge according to the comparison result during discharge by comparing a voltage at both ends of the sensing resistor of the power management unit of the external system, which is sensed through the overcurrent sensing step, with a predetermined reference discharge overcurrent blocking voltage value.

7. The method of claim 6, wherein the charge overcurrent detection step detects that the battery is in an overcurrent state due to overcharge if a voltage at both ends of the sensing resistor of the power management unit of the external system, which is sensed through the overcurrent sensing step, is more than a predetermined reference charge overcurrent voltage value,
wherein the discharge overcurrent detection step detects that the battery is in overcurrent due to overdischarge if a voltage at both ends of the sensing resistor of the power management unit of the external system, which is sensed through the overcurrent sensing step, is more than a predetermined reference discharge overcurrent voltage value.

8. The method of claim 7, wherein the overcurrent blocking step turns off the charge control FET to block overcurrent due to overcharge if the battery is detected to be in an overcurrent state due to an overcharge through the charge overcurrent detection step, and
turns off the discharge control FET to block overcurrent by overdischarge if the battery is detected to be in an overcurrent state due to an overdischarge through the discharge overcurrent detection step.

9. A battery pack comprising a battery protection circuit according to claim 1.

10. A device comprising a battery pack according to claim 9.

* * * * *